(12) United States Patent
Lou

(10) Patent No.: US 8,886,402 B1
(45) Date of Patent: Nov. 11, 2014

(54) ACTIVELY VARIABLE SHOCK ABSORBING STRUT AND SYSTEM

(75) Inventor: Ken-An Lou, Phoenix, AZ (US)

(73) Assignee: Armorworks Enterprises LLC, Chandler, AZ (US)

(*) Notice: Subject to any disclaimer, the term of this patent is extended or adjusted under 35 U.S.C. 154(b) by 592 days.

(21) Appl. No.: 13/091,854

(22) Filed: Apr. 21, 2011

Related U.S. Application Data

(60) Provisional application No. 61/326,928, filed on Apr. 22, 2010.

(51) Int. Cl.
| | |
|---|---|
| *B60G 17/018* | (2006.01) |
| *G01C 5/00* | (2006.01) |
| *G06F 19/00* | (2011.01) |
| *G08B 21/00* | (2006.01) |
| *G08B 23/00* | (2006.01) |
| *B64C 17/00* | (2006.01) |
| *G01M 1/12* | (2006.01) |
| *G01C 19/00* | (2013.01) |
| *F16F 9/00* | (2006.01) |

(52) U.S. Cl.
USPC .......... 701/37; 701/1; 701/9; 701/15; 701/16; 701/120; 701/124; 244/1 N; 244/13; 244/17.17; 244/50; 244/54; 244/104 FP; 340/945; 340/960; 340/967; 73/65.05; 73/65.06; 73/178 T; 188/266; 188/289; 188/313; 188/376

(58) Field of Classification Search
USPC ..... 244/1 N, 13, 17.17, 50, 54, 100 R, 102 A, 244/102 R, 102 SL, 102 SS, 103 R, 104 FP, 244/104 R, 137.1, 108, 130, 202, 203; 701/1–9, 15, 16, 37, 120, 124; 340/945, 960, 967; 73/65.05, 65.06, 73/178 T; 188/266, 289, 313, 376; 248/557
See application file for complete search history.

(56) References Cited

U.S. PATENT DOCUMENTS

| | | | |
|---|---|---|---|
| 3,598,207 A | 8/1971 | Hartel | |
| 3,604,725 A | 9/1971 | Goff | |
| 3,696,894 A | 10/1972 | Brady | |
| 3,716,208 A | 2/1973 | Fagan | |
| 4,061,295 A | 12/1977 | Somm | |
| 4,065,078 A | 12/1977 | Jenkins | |
| 4,126,212 A | 11/1978 | Crawley | |
| 4,524,929 A | 6/1985 | Gebhard | |
| 4,552,324 A | 11/1985 | Hrusch | |
| 4,595,159 A | 6/1986 | Hrusch | |
| 4,597,548 A * | 7/1986 | Bergloff et al. | ......... 244/104 FP |
| 4,729,529 A | 3/1988 | Hrusch | |
| 4,973,854 A | 11/1990 | Hummel | |
| 5,085,412 A | 2/1992 | Peterson | |
| 5,848,677 A | 12/1998 | Beck | |

(Continued)

Primary Examiner — James Trammell
Assistant Examiner — Majdi Alsomiri
(74) Attorney, Agent, or Firm — James L Farmer

(57) ABSTRACT

Methods and apparatus are provided for an actively variable shock absorbing system for actively controlling the load response characteristics of a shock absorbing strut. In one embodiment the shock absorbing system comprises a controllable valve adapted for actively varying a load response characteristic of the shock absorbing strut. The shock absorbing system further comprises an electronic control system comprising an input for receiving a signal from a sensor, an algorithm adapted to determine an optimal position for the controllable valve in view of the sensor signal, and an output for sending a control signal to the controllable valve to place the valve in the optimal position.

33 Claims, 3 Drawing Sheets

(56) References Cited

U.S. PATENT DOCUMENTS

| | | | |
|---|---|---|---|
| 5,944,283 A | 8/1999 | Carter | |
| 5,988,606 A | 11/1999 | Gatehouse | |
| 5,996,979 A * | 12/1999 | Hrusch | 267/64.11 |
| 6,032,090 A * | 2/2000 | von Bose | 701/37 |
| 6,120,009 A | 9/2000 | Gatehouse | |
| 6,154,693 A * | 11/2000 | Aberschitz et al. | 701/16 |
| 6,279,854 B1 | 8/2001 | Lindahl | |
| 6,293,141 B1 * | 9/2001 | Nance | 73/178 T |
| 6,308,916 B1 | 10/2001 | Hrusch | |
| 6,467,593 B1 | 10/2002 | Corradini | |
| 6,619,445 B2 | 9/2003 | Forster | |
| 6,676,075 B2 * | 1/2004 | Cowan et al. | 244/100 R |
| 6,725,983 B2 | 4/2004 | Bell | |
| 7,274,309 B2 * | 9/2007 | Nance | 340/960 |
| 7,320,387 B2 | 1/2008 | Sendrea | |
| 7,438,164 B2 | 10/2008 | Groves | |
| 7,552,803 B2 * | 6/2009 | Luce | 188/1.11 E |
| 8,042,765 B1 * | 10/2011 | Nance | 244/100 R |
| 8,055,396 B2 * | 11/2011 | Yates et al. | 701/16 |
| 8,180,504 B1 * | 5/2012 | Nance | 701/5 |
| 8,515,600 B1 * | 8/2013 | McCusker | 701/9 |
| 2002/0121415 A1 * | 9/2002 | Hartel | 188/282.2 |
| 2007/0221783 A1 * | 9/2007 | Parks et al. | 244/102 A |
| 2008/0114506 A1 * | 5/2008 | Davis et al. | 701/16 |

* cited by examiner

ACTIVELY VARIABLE SHOCK ABSORBING STRUT AND SYSTEM

STATEMENT REGARDING FEDERALLY SPONSORED RESEARCH OR DEVELOPMENT

This invention was made with government support under contract no. W911W6-10-C-0050 awarded by the U.S. Army Research, Development & Engineering Command, Aviation Applied Technology Directorate, Fort Eustis, Va. The government has certain rights in the invention.

TECHNICAL FIELD AND BACKGROUND

The instant invention relates to devices and systems adapted to provide shock attenuated support for a body subjected to relative acceleration or shock with respect to a supporting surface or object. Such devices and systems may include for example shock absorbers, springs, dampers, energy attenuators, shock absorbing struts and associated systems utilized in vehicles such as various aircraft, helicopters, land vehicles, and watercraft for attenuating shock loads caused by contact with the ground or other surface; as well as shock mounted seats, equipment, cargo, or other objects mounted within or on a moving vehicle, watercraft, or other surface.

DESCRIPTION OF THE EMBODIMENTS

Figure 1:
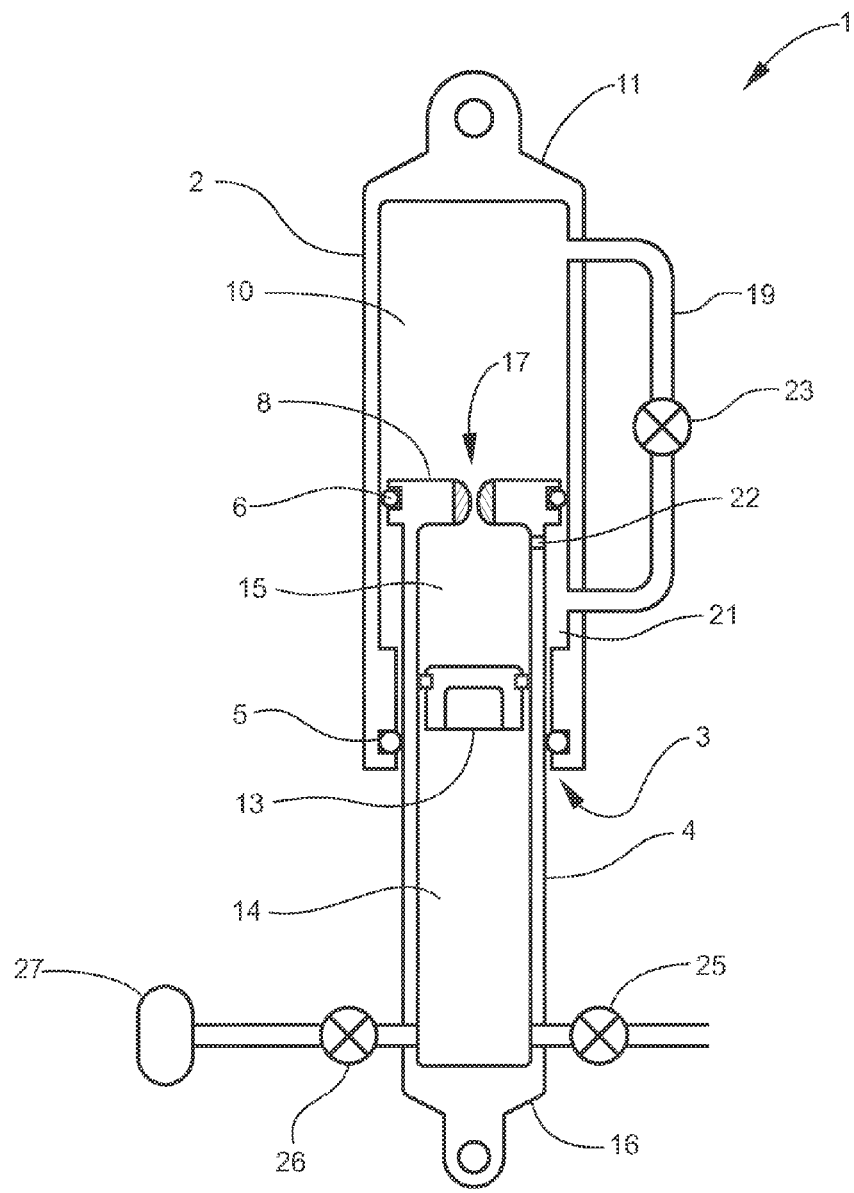
FIG. 1 is a cross section of an exemplary actively variable shock absorbing strut.

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

The term "aircraft" as used herein may refer to or encompass, among other things, fixed wing aircraft, gliders, helicopters, autogyros, lighter than air craft, rockets, space craft, and other airborne vehicles or objects that may intermittently come into contact with the ground or other fixed surface.

The term "lookup table" as used herein may refer to or encompass, among other things, a table, graph, relational database, or other associative array for relating input data to stored information.

The term "strut" as used herein may refer to or encompass, among other things, a shock absorbing device such as a viscous damping shock absorber, gas spring strut, or any other member employed to attenuate shock loads imparted to a body.

Referring now to the drawings, FIG. 1 depicts an exemplary actively variable strut 1. In an aircraft embodiment, for example, strut 1 may be disposed between a displaceable, ground contacting portion of a landing gear assembly and the airframe of the aircraft. The exemplary strut 1 comprises a cylinder 2 with an open end 3, and a piston 4 disposed for telescopically sliding engagement within cylinder 2 from the open end 3. A main seal 5 on the inside of the cylinder 2 near open end 3, and a piston seal 6 on the end of the piston inside cylinder 2 provide sliding seals between the outer surface of piston 4 and the inner surface of cylinder 2. An end cap 8 of piston 4 defines one end of a main fluid chamber 10 within cylinder 2 bounded at the other end by the cylinder head 11. Accordingly, movement of the piston 4 relative cylinder head 11 reduces or enlarges the volume of chamber 10.

In the present embodiment exemplary piston 4 is hollow, and comprises a gas spring portion of the exemplary strut. In particular, a floating piston 13 disposed within piston 4 divides the inner volume of the piston 4 into a gas chamber 14 on one side, and a piston fluid chamber 15 on the other side. The gas chamber 14 is bounded by the floating piston 13, the inner surface of piston 4, and the outer, closed end 16 of piston 4; while the piston fluid chamber 15 is bounded by the floating piston 13, the inner surface of piston 4, and the piston end cap 8. A fixed orifice 17 in the end cap 8 allows a metered flow of fluid to pass from main fluid chamber 10 into piston fluid chamber 15.

Continuing with FIG. 1, the gas chamber 14 may include a pressure relief valve 25 and a gas fill valve 26. The pressure relief valve 25 may be a manually adjusted valve that is pre-set to a desired pressure, or an electronically operated valve capable of active adjustment during strut operation. For example, valve 25 may comprise a conical disc spring (CDS)

type valve fitted with a servomotor adapted to adjust the pre-compression of the CDS and maximum gas pressure. The gas fill valve 26 may be a simple poppet valve, or an electronically operated valve used in conjunction with a pressurized gas source 27 for rapidly varying gas pressure in piston 4. Pressurized gas source 27 may be a pump, an accumulator, or a combination including suitable pressure control features such as found, for example, in a typical air compressor. In one embodiment valve 26 is a two position valve, with a charge position creating a passage from gas chamber 14 to gas source 27, and a discharge position for venting gas chamber 14. The connection between chamber 14 and gas source 27, and the throat of valve 26, are large enough to avoid unnecessarily creating a restriction to the flow of gas into or out of chamber 14.

Although shown in FIG. 1 as a single stage, single gas chamber configuration, the piston 4 may comprise a multi stage design with two or more gas chambers and floating pistons. Moreover, multiple gas spring stages may be suitably arranged in any of various ways, including end to end, side-by-side, or in a concentric arrangement such as disclosed in U.S. Pat. No. 5,085,412, the relevant portions of which are hereby incorporated by reference. In a multi-stage configuration, each gas chamber may be provided with a dedicated gas fill valve and pressure relief valve. Alternatively only the highest pressure stage is provided with a pressure relief valve.

Still continuing with FIG. 1, a fluid bypass tube 19 connects main fluid chamber 10 with an annular fluid chamber 21 bounded on the sides by the inside of cylinder 2 and outside of piston 4, and at the ends by main seal 5 and piston seal 6. The bypass tube 19 allows fluid to flow between main fluid chamber 10 and annular fluid chamber 21. For example, as the strut strokes under a compressive external load, the piston 4 forces the hydraulic fluid in chamber 10 through bypass tube 19, and into annular chamber 21. From there the fluid is forced through one or more passages 22 in the wall of piston 4 to the piston fluid chamber 15. Hydraulic fluid may be simultaneously forced through the fixed orifice 17 into the piston fluid chamber 15 where it combines with the fluid from the bypass tube, displacing the floating piston toward closed end 16, and compressing the gas in chamber 14. Under static load conditions the piston 4 will stroke into cylinder 2 until the gas pressure in chamber 14 reaches equilibrium with the externally applied load.

Fluid damping is provided by the fixed orifice(s) 17 in piston end cap 8, and an actively variable damping valve 23 operable to variably restrict fluid flow through bypass tube 19. Although depicted as being mounted in approximately the middle of bypass tube 19, the variable damping valve 23 may be located anywhere along the bypass tube 19, including at a juncture of the bypass tube with cylinder 2. Alternatively, valve 23 may be located for example inside chamber 10, or on cylinder head 11. Damping valve 23 may be continuously or step-wise operable between minimum and maximum flow area settings based on control signals derived from various sensors and data sources internal and external to the strut 1. In addition, damping valve 23 may be a single valve as depicted, or alternatively a plurality of continuously or step-wise operable valves in various parallel or series arrangements.

In one embodiment the damping valve 23 comprises a variable orifice valve, such as ball, spool, or gate type valve, driven by a fast reacting type electric actuator such as various solenoid and piezoelectric devices. Examples of suitable commercially available actuated valves include the VED03M solenoid spool valve manufactured by Continental Hydraulics, with an advertized response time of 50 miliseconds; various AC solenoid valves sold by G. W. List Company with an advertized response time of 5 milliseconds; the VST-1410D poppet valve sold by Enerpac; the RE29035/02.09 spool valve manufactured by Bosch Rexroth AG with an advertized response time of less than 10 milliseconds, and industrial piezoelectric actuator driven valves sold by Lileya LTD, and Discovery Technology International (DTI).

Figure 2:
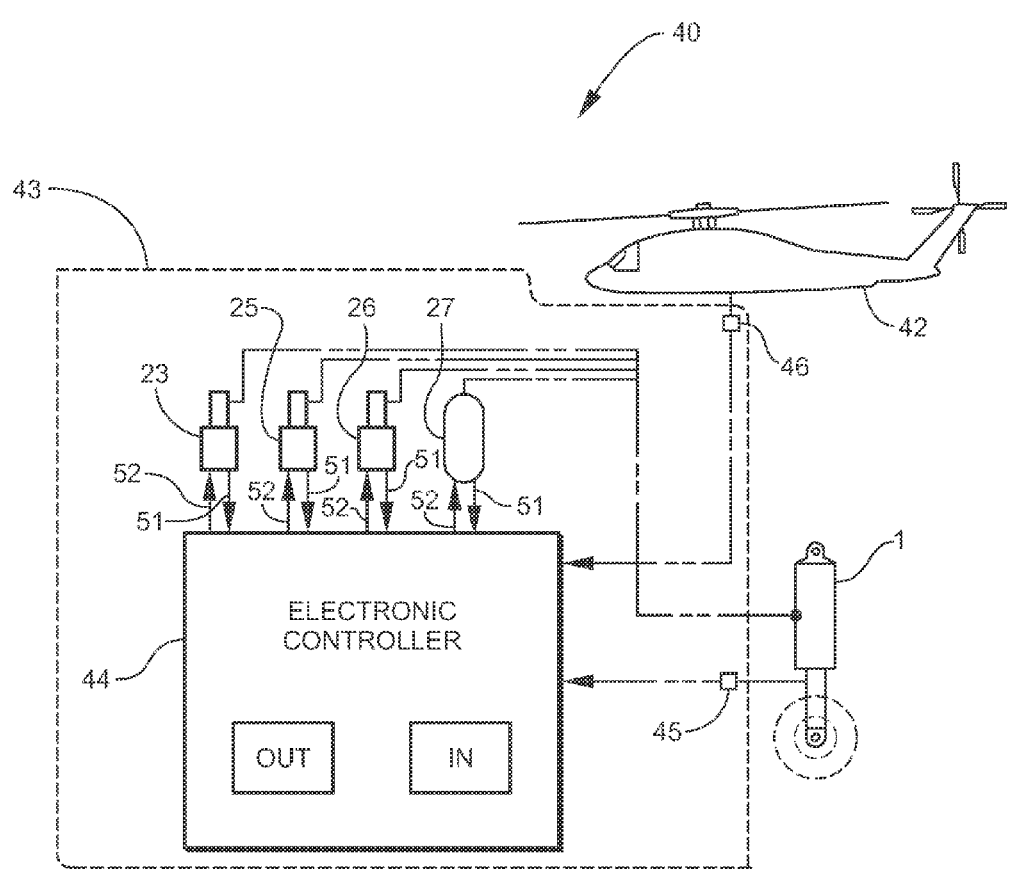
FIG. 2 is a schematic representation of an actively variable shock absorbing system.

FIG. 2 illustrates an exemplary actively variable shock absorbing system 40 that includes an actively variable strut such as strut 1, a shock mounted body 42 supported by strut 1, and a control system 43. Although depicted as a helicopter, the shock mounted body 42 may comprise any type of vehicle or object that utilizes shock absorbing devices, such as automobiles, and various aircraft. In addition, shock mounted body 42 may comprise any other body subjected to relative acceleration with a supporting surface or object, such as for example shock mounted seats, equipment, cargo, or other objects mounted within or on a moving vehicle, aircraft, watercraft, or surface. It should be noted that portions of the description below are in the context of aircraft and helicopter applications, and the shock mounted body 42 is alternatively referred to in some instances as aircraft 42 or helicopter 42. Such references are made out of convenience, and with no intent to unduly limit the scope of shock mounted body 42 to a particular referenced embodiment.

The control system 43 comprises an electronic controller 44 (also referred to as processor, or microprocessor 44) with an input and an output, strut sensors 45, shock mounted body sensors 46, and electronically controllable system components such as actively variable valves 23, 25, 26, and pressurized gas source 27. Strut sensors 45 may include for example pressure sensors for measuring strut internal gas pressure and hydraulic fluid pressure, and load sensors for measuring an externally applied load. The shock mounted body sensors 46 may include for example sensors or instruments for measuring linear velocity and acceleration, vertical velocity and acceleration, angular velocity and acceleration, distance from an approaching surface, closing rate with an approaching surface, stiffness of an approaching surface, weight of the shock mounted body, and ambient temperature.

The valves 23, 25, 26, and gas source 27 are connected to the processor 44 which receives feedback signals from the components as indicated by arrows 51, and sends control signals to the components as indicated by arrows 52, in order to operate the valves in a desired manner as determined by the processor 44 based on its control logic and the sensory inputs received by the input of processor 44. FIG. 2 schematically depicts the processor 44 receiving input signals from sensors 46 associated with an aircraft, and from sensors 45 associated with the strut 1. The controller 44 controls any of the damping valve 23, pressure relief valve 25, gas fill valve 26, and pressurized gas source 27, independently or in combinations, to achieve desired damping, spring force, and length characteristics of the strut 1.

In one embodiment the control system 43 is operable in active and semi-active modes. In a semi-active mode, the processor 44 uses input from the sensors to predict the parameters of an anticipated loading event. For example, in an aircraft application, data from sensors 45, 46 is used to predict aircraft landing conditions. Appropriate control signals 52 are generated and sent via the processor output to the valves, prior to touchdown, to pre-adjust the strut 1 for the anticipated landing loads. In one particular embodiment the aircraft sensors 46 comprise sensors or instrumentation for measuring aircraft sink rate and height above ground. The control system 43 may use the sink rate and height above ground data, with other information as warranted, to determine the rate at which an aircraft is closing with the ground, and to calculate the amount of energy that must be absorbed on landing. Height above ground data can be backed out from altimeter data if ground altitude is known, or alternatively by direct measurement using onboard sensing instruments such as distance measuring radar equipment often incorporated in aircraft terrain avoidance systems.

Alternatively, distance measuring systems developed for other industries may be effectively adapted for the instant invention. For example, collision avoidance radar systems used worldwide in the automobile industry are one example of a suitable and available distance measuring radar technology. In particular, suitable radar based technologies include for example a collision prediction system for military trucks marketed by Eaton Corporation under the name VORAD, a silicon based chip technology developed by Semiconductor Research Corporation and the University of Florida, and a distance sensing system developed by Ibeo Automotive Systems of Germany that uses laser technology.

Using data from the onboard sensors and/or instruments, the control system 43 pre-sets one or all of valves 23, 25, 26 to achieve a damping and pressure level calculated to fully absorb the predicted landing energy with the maximum stroke length. The sensors 46 may be monitored continuously during descent, allowing the control system 43 to continually re-calculate the rate at which the aircraft is closing with the ground, and re-adjust the valves as required. The control system 43 may also utilize additional sensors 46 and information to further characterize the landing conditions, and adjust the struts accordingly. For example, such additional information may include airspeed, roll rate, rate of change in sink rate, aircraft gross weight, and ambient temperature. In addition, image sensors may be utilized to discern ground conditions, such as sensing pavement versus gravel or mud for example, to further augment the predictive sensory information provided to the control system 43 and processor 44.

In an active control mode, the strut is adjusted in real time rather than in advance. For example, in an aircraft or helicopter landing event, sensors 45 and 46 provide input to the controller immediately upon touchdown and as the strut strokes to absorb the landing force. Control signals 52 and feedback signals 51 are generated and sent between the valves and the processor in real time, adjusting the strut throughout the landing stroke. The active mode may thus be used to correct for errors in the pre-event valve settings established in a semi-active mode. In this embodiment the control valves are very fast reacting, and may comprise for example actuators using stacked washers of piezoelectric material.

The processor 44 includes a valve control algorithm adapted to determine valve control signals using information from sensors 45 and 46 and other information particular to the application and circumstances, such as for example gross weight, strut location, and strut mounting configuration. In one embodiment the valve control algorithm calculates optimal valve positions and outputs valve control signals in a substantially continuous manner. The algorithm may comprise for example a lookup table with the desired relationships between the valve positions and the sensor data stored in memory. Alternatively the algorithm may be computation based, wherein valve positions and control signals are determined by an appropriate set of equations.

Figure 3:
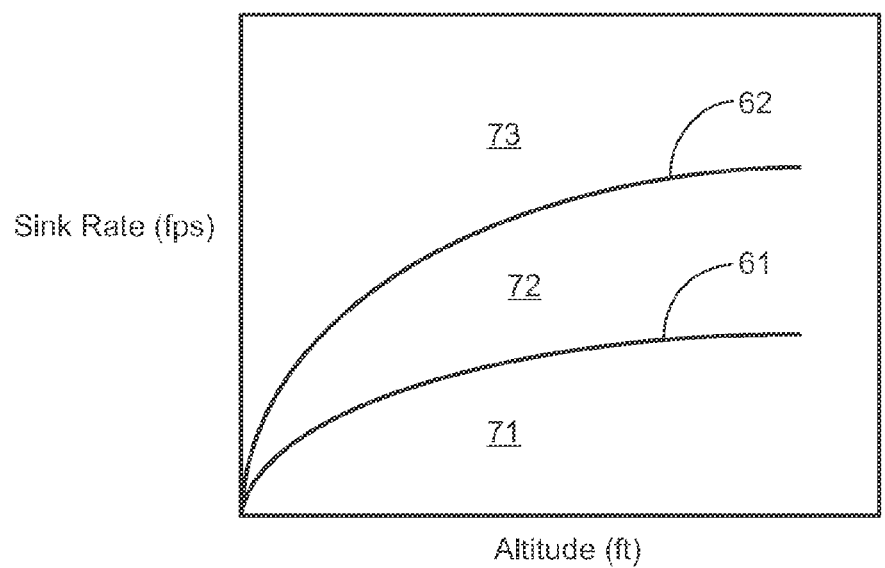
FIG. 3 is a representation of a lookup table in the form of a graph that delineates categories of aircraft landing severity using aircraft sensor data.

In another embodiment, a processor control algorithm outputs one set of valve control signals associated with a discreet range or category of anticipated or real time loading events. FIG. 3 is a two dimensional graph, again in the context of aircraft generally, with aircraft sink rate on one axis, and height above ground on the other axis. Two curves, 61 and 62, divide the graph into three distinct regions, 71, 72, and 73. In the example of FIG. 3, region 71 may represents combinations of sink rate and height above ground associated with a normal aircraft landing for example, with regions 72 and 73 then representing combinations of aircraft sink rate and height above ground associated with a hard landing, and crash landing respectively. A graph such as FIG. 3 may be incorporated into the control algorithm in the form of a lookup table, or other equivalent associative array. In the present embodiment the lookup table relates each region of the graph to one set of valve positions and valve control signals optimized for that category of event. Thus instead of continuously updating the valve positions, the algorithm of the present embodiment updates the valve positions only when crossing from one region of the graph to another. It should be appreciated that the three regions are exemplary, and a lookup table such as represented by FIG. 3 may comprise any number of curves and regions appropriate or necessary for a particular application.

The same type of region based lookup table may also be used in an active mode. For example, continuing with the above described aircraft landing example, the algorithm may further comprise discreet ranges of strut pressure values and valve positions stored in processor memory. Immediately following touchdown, data from selected strut sensors 45 is monitored and compared to a predicted pressure range calculated prior to touchdown. If the measured pressure falls outside the predicted range, the algorithm outputs a corrective set of valve positions and valve control signals associated with the pressure range in the lookup table containing the measured pressure.

A region based active mode algorithm may also take into account more than piece of real time sensory information. For example, inertial airframe acceleration may be monitored as well, and compared in conjunction with measured strut pressure to stored regions of acceleration and pressure combinations. The ranges may be delineated by curves in a graph as previously described. If the measured parameter pair falls outside an expected or desired region, the algorithm outputs a corrective set of valve positions called out by the lookup table for the region containing the actual measured values.

The control system 43 may also be used in both semi-active and active modes to provide a smooth and comfortable ride during aircraft taxi. For example, data such as aircraft gross weight and ambient temperature may be used to predict strut damping requirements. The damping valve 23 may be adjusted accordingly prior to taxi using any of the previously described algorithms to produce the required damping. During taxi, strut 1 may be continuously re-adjusted in active mode using a feedback algorithm to optimize the valve settings and damping level. For example, if measured peak strut loads or peak hydraulic pressures are too high, that information is fed back to the algorithm, and a corrective setting for damping valve 23 is calculated and transmitted. The algorithm in this aspect may again operate in a continuously variable manner, or with a limited set of valve corrections based on ranges of measured parameters.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. A system for actively controlling the load response characteristics of a shock absorbing aircraft landing gear assembly, comprising:
    a shock absorbing strut disposed between a displaceable, ground contacting portion of the landing gear assembly and the airframe of the aircraft;
    a passage from a first fluid chamber in the strut to a second fluid chamber in the strut;
    a controllable valve adapted for actively varying a load response characteristic of the shock absorbing strut by controlling the rate at which fluid may flow through the passage from the first fluid chamber to the second fluid chamber;
    a sensor onboard the aircraft providing a signal representative of an aircraft landing parameter; and
    a control system comprising an input for receiving the sensor signal, an algorithm adapted to calculate the rate at which the aircraft is closing with the ground using sink rate and height above ground data, and determine an associated optimal position for the controllable valve, and an output for sending a control signal to the controllable valve to place the valve in the optimal position prior to the aircraft touching down.

2. The system of claim 1, wherein in addition to sink rate and height above ground data, the algorithm uses any one of, or any combination of the group comprising: rate of change in aircraft sink rate; aircraft linear velocity; aircraft angular velocity; ambient temperature; aircraft gross weight; and ground surface conditions.

3. The system of claim 2, wherein the sensor onboard the aircraft comprises a short range radar system capable of instantaneously measuring aircraft height above ground.

4. The system of claim 3, wherein the short range radar system is further capable of instantaneously determining aircraft sink rate.

5. The system of claim 3, wherein the short range radar system is of a type used in automotive collision avoidance systems.

6. The system of claim 2, wherein the algorithm further calculates predicted aircraft vertical velocity at impact.

7. The system of claim 6, wherein the algorithm incorporates a look-up table relating selected aircraft landing parameters to predicted aircraft vertical velocity at impact.

8. The system of claim 2, wherein the algorithm comprises a curve that delineates a first landing condition and associated first control valve signal, from a second landing condition and associated second control valve signal, the first landing condition comprising combinations of aircraft sink rate and height above ground falling on one side of the curve, and the second landing condition comprising combinations of aircraft sink rate and height above ground falling on the other side of the curve.

9. The system of claim 8, wherein the first landing condition and associated first control valve signal correspond to a normal landing.

10. The system of claim 1, further comprising a gas valve adapted to actively vary the pressure in a gas spring portion of the strut.

11. The system of claim 1, wherein the algorithm is adapted to substantially continuously update the optimal position for the controllable valve, and the control system is adapted to substantially continuously transmit updated control signals to the controllable valve.

12. An actively variable aircraft shock absorbing system adapted for controlling the load response characteristics of a shock absorbing aircraft landing gear assembly, comprising:
    a shock absorbing strut disposed within a load path between a displaceable, ground contacting portion of the landing gear assembly and the aircraft airframe;
    a passage from a first fluid chamber in the strut to a second fluid chamber in the strut;
    a strut adjustment mechanism for actively varying a load response characteristic of the shock absorbing strut by controlling the rate at which fluid may flow through the passage from the first fluid chamber to the second fluid chamber;
    a sensor adapted for instantaneous measurement of aircraft height above ground; and
    a controller comprising an input for receiving a signal from the sensor, an algorithm adapted to calculate the rate at which the aircraft is closing with the ground using aircraft sink rate and height above ground data, and determine a corresponding strut adjustment signal, and an output for sending the strut adjustment signal to the strut adjustment mechanism prior to the aircraft touching down.

13. The actively variable aircraft shock absorbing system of claim 12, wherein the algorithm further takes into account any of the group comprising: rate of change in aircraft sink rate; aircraft linear velocity; aircraft rotational velocity; ambient temperature; aircraft gross weight; and ground surface conditions.

14. The actively variable aircraft shock absorbing system of claim 12, wherein the height above ground sensor is a downward looking radar based system.

15. The actively variable aircraft shock absorbing system of claim 14, wherein the downward looking radar based system is selected from the group comprising: aircraft terrain avoidance radar systems; and automotive collision avoidance radar systems.

16. The actively variable aircraft shock absorbing system of claim 12, wherein the strut adjustment mechanism is any one of or any combination of the group comprising: a flow control valve to vary the amount of viscous damping in the strut; a source of pressurized gas to vary the pressure in a gas spring portion of the strut; and a pressure relief valve to vary the maximum allowable gas pressure.

17. The actively variable aircraft shock absorbing system of claim 12, wherein the algorithm incorporates a look-up table assigning a first landing condition and associated first strut adjustment signal to a first array of aircraft sink rates and heights above ground; and a second landing condition and associated second strut adjustment signal to a second array of aircraft sink rates and heights above ground.

18. The actively variable aircraft shock absorbing system of claim 17, wherein the look-up table comprises a curve separating the first array of aircraft sink rates and heights above ground on one side of the curve from the second array of aircraft sink rates and heights above ground on the other side of the curve.

19. The actively variable aircraft shock absorbing system of claim 18, wherein the first array of aircraft sink rates and heights above ground corresponds to a normal landing.

20. The actively variable aircraft shock absorbing system of claim 12, wherein the algorithm is adapted to substantially continuously update the strut adjustment signal, and the controller is adapted to substantially continuously transmit updated strut adjustment signals to the strut adjustment mechanism.

21. A method for actively varying the load response characteristics of an aircraft landing gear assembly, comprising:
   mounting a shock absorbing strut between a displaceable, ground contacting portion of the landing gear assembly and the aircraft structure;
   monitoring aircraft sink rate and height above ground;
   calculating the rate at which the aircraft is closing with the ground using the aircraft sink rate and height above ground data; and
   prior to the aircraft touching down adjusting a characteristic of the shock absorbing strut calculated to minimize the peak load imparted to the aircraft structure by operating a controllable valve to control the rate at which a fluid may flow through a bypass from a first fluid chamber in the strut to a second fluid chamber in the strut.

22. The method of claim 21, wherein monitoring aircraft height above ground comprises use of a radar system.

23. The method of claim 22, wherein monitoring aircraft sink rate also comprises use of a radar system.

24. The method of claim 22, wherein the radar system is of a type used in automotive collision avoidance systems.

25. The method of claim 21, wherein the act of adjusting a characteristic of the shock absorbing strut calculated to minimize the peak load imparted to the aircraft comprises any of the following: adjusting the degree of damping in a viscous fluid damping portion of the strut; varying the gas pressure in a gas spring portion of the strut; and varying a gas pressure relief setting.

26. The method of claim 21, wherein calculating the rate at which the aircraft is closing with the ground comprises assigning a first landing condition and associated first strut adjustment signal to a first array of aircraft sink rates and heights above ground; and assigning a second landing condition and associated second strut adjustment signal to a second array of aircraft sink rates and heights above ground.

27. The method of claim 26, wherein a look-up table comprises a curve delineating the first array of aircraft sink rates and heights above ground on one side of the curve from the second array of aircraft sink rates and heights above ground on the other side of the curve.

28. The method of claim 27, wherein the first array of aircraft sink rates and heights above ground corresponds to a harder than normal landing.

29. The method of claim 21, further comprising monitoring a strut parameter after initial contact of the landing gear with the ground, and actively adjusting a load response characteristic of the shock absorbing strut as the strut strokes to absorb the landing load.

30. The method of claim 29, further comprising monitoring a strut parameter after the landing stroke of the strut, and adjusting a load response characteristic of the shock absorbing strut accordingly.

31. An actively variable shock absorbing system for actively controlling the load response characteristics of a shock absorbing aircraft landing gear strut, comprising:
   a bypass connecting a first fluid chamber in the strut to a second fluid chamber in the strut;
   a first controllable valve adapted for controlling the rate at which fluid may flow through the bypass from the first fluid chamber to the second fluid chamber;
   a second controllable valve selected from the group comprising an actively variable gas valve to vary the pressure in a gas spring portion of the strut and an actively variable pressure relief valve to vary the relief pressure in a gas spring portion of the strut; and
   an electronic control system comprising an input for receiving sink rate and height above ground data, an algorithm that calculates the rate at which the aircraft is closing with the ground using the sink rate and height above ground data, and determines a corresponding optimal position for at least one of the first and second controllable valves, and an output for sending a control signal to the respective controllable valve or valves to place the valve or valves in the optimal position.

32. The actively variable shock absorbing system of claim 31, further comprising a strut internal pressure sensor.

33. The actively variable shock absorbing system of claim 31, further comprising a strut load sensor.

* * * * *